United States Patent [19]

Dombrowski

[11] Patent Number: 5,250,945
[45] Date of Patent: Oct. 5, 1993

[54] SCHOOL BUS OBSTACLE DETECTION DEVICE

[76] Inventor: Anthony E. Dombrowski, 5130 So. 98th Ct. #5, Omaha, Nebr. 68127

[21] Appl. No.: 804

[22] Filed: Jan. 5, 1993

Related U.S. Application Data

[63] Continuation of Ser. No. 617,948, Nov. 27, 1990, abandoned, which is a continuation of Ser. No. 178,777, Apr. 1, 1988, abandoned, which is a continuation of Ser. No. 38,448, Apr. 14, 1987, abandoned, which is a continuation of Ser. No. 633,523, Jul. 23, 1984, abandoned, which is a continuation-in-part of Ser. No. 579,160, Feb. 10, 1984, abandoned.

[51] Int. Cl.$^5$ .................................. G08G 1/00
[52] U.S. Cl. .................................. 340/901; 340/903; 340/904; 340/433
[58] Field of Search ............... 340/901, 903, 904, 435, 340/433; 367/909; 180/169; 342/27, 28, 114, 118

[56] References Cited

U.S. PATENT DOCUMENTS

| | | | |
|---|---|---|---|
| 2,974,304 | 3/1961 | Nordlund | 367/112 |
| 3,226,673 | 12/1965 | Cudworth | 367/112 |
| 3,732,555 | 5/1973 | Strenglein . | |
| 3,760,415 | 9/1973 | Holmstrom et al. | 180/169 |
| 3,781,879 | 12/1973 | Staras et al. | 343/5 R |
| 4,001,823 | 1/1977 | Matsui et al. | 343/7 A |
| 4,015,232 | 3/1977 | Sindle . | |
| 4,073,359 | 2/1978 | Fujiki et al. | 343/7 VM |
| 4,260,980 | 4/1981 | Bates | 340/904 |
| 4,278,962 | 7/1981 | Lin . | |
| 4,300,116 | 11/1981 | Stahovec | 340/904 |
| 4,349,823 | 9/1982 | Tagami et al. | 340/904 |
| 4,358,759 | 11/1982 | Stewart et al. | 343/5 PD |
| 4,404,541 | 9/1983 | Kodera et al. . | |
| 4,442,512 | 4/1984 | Kodera et al. | 340/904 |
| 4,490,716 | 12/1984 | Tsuda et al. | 340/904 |
| 4,543,577 | 9/1985 | Tachibana et al. | 343/7 VM |
| 4,779,095 | 10/1988 | Guerreri | 340/901 |

OTHER PUBLICATIONS

"Improved Backup Alarm Technology for Mobile Mining Equipment", Johnson et al., Bureau of Mines Information Circular, 1986, IC 9079.

Primary Examiner—Brent Swarthout
Attorney, Agent, or Firm—Sherman & Shalloway

[57] ABSTRACT

A driver alerting device for a school bus or the like includes a pair of transceivers adapted for mounting at the forward end and below the vehicle. Return wave signals from any object or person within the transceiver range are supplied to the transceiver through an antenna connection. Any resultant doppler shift signal is amplified for driving the audio alarm to alert the driver to the presence of a person or object within the transceiver range.

3 Claims, 2 Drawing Sheets

SCHOOL BUS OBSTACLE DETECTION DEVICE

This application is a continuation of application Ser. No. 7/617,948, filed Nov. 27, 1990, now abandoned, which is a continuation of application Ser. No. 07/178,777 filed Apr. 1, 1988 which is a continuation of Ser. No. 07/038,448 filed Apr. 14, 1987 which is a continuation of Ser. No. 06/633,523 filed Jul. 23, 1984, all now abandoned, which is a continuation-in-part patent application of my copending patent application Ser. No. 579,160, now abandoned, filed Feb. 10, 1984, now abandoned.

BACKGROUND OF THE INVENTION

The present invention is directed generally to a pair of safety devices for alerting the driver of a school bus to the presence of any object beneath the bus, forwardly of the bus, and to the passenger discharging side of the bus. More particularly, the present invention is directed to a micro-wave radar device using the doppler shift principle to detect the presence of an object within the transceiver range.

Drivers of school buses have limited visibility from the driver's seat within the bus. When children are discharged from the bus, the children frequently will dart beneath the bus to retrieve objects such as balls, etc. Likewise, a child will sometimes dart immediately in front of the bus. In either situation, the driver may be unaware of the presence of the child in the dangerous position and may seriously injure the child should he proceed while the child is in the area of danger.

Accordingly, an object of the invention is to provide a safety device for alerting the driver of a school bus to the presence of a person or object beneath the bus, to the side of the bus, and immediately in front of the bus.

A further object of the invention is to provide a device with a remote audible alarm suitable for placement within a school bus.

Yet another object of the invention is to provide a driver alerting device for a school bus which may be coordinated with the means for opening and closing the passenger door.

Still another object of the invention is to provide a driver alerting device which is economical to manufacture, simple and rugged in construction and efficient in operation.

SUMMARY OF THE INVENTION

The driver alerting device of the present invention includes a pair of transceivers adapted for mounting at the forward end of the school bus and beneath the school bus. The first transceiver directs its wave output across the area immediately forwardly of the bus while the second transceiver directs its wave output beneath the bus forwardly of the rear wheels. Return wave signals for any object within the transceiver range are supplied to the transceiver through an antenna connection. Any resultant doppler shift signal is amplified for driving the audio alarm. The circuit of the device is preferably adapted for electrical connection to the means for opening and closing the passenger door.

The driver alerting device thus immediately sounds an alarm when any moving or stationary object is detected within the range of either transceiver. Because the devices operate by micro-wave radar, they are unaffected by noise, light or weather conditions such as snow, rain, heat and cold.

DESCRIPTION OF THE PREFERRED EMBODIMENT

Figure 1:
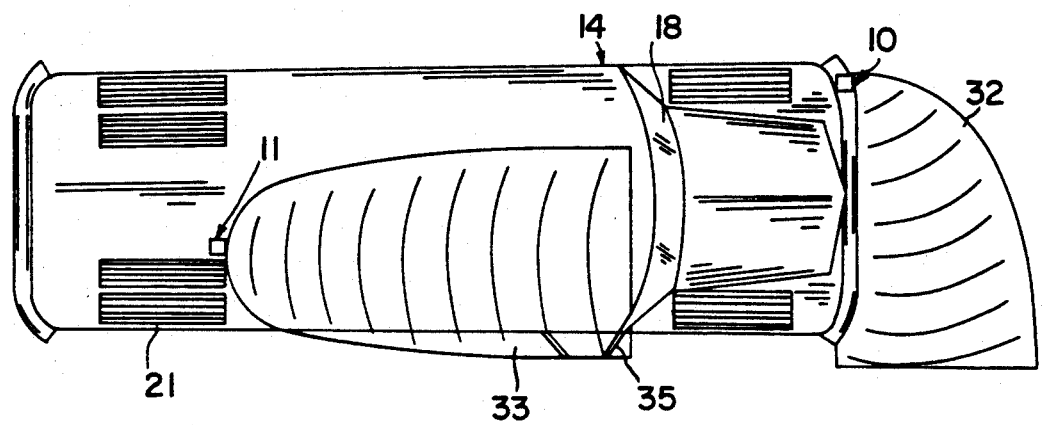
FIG. 1 is a diagrammatic top plan view of the driver alerting devices installed on a school bus.

The driver alerting system or safety sensor of the present invention is comprised of a pair of identical devices 10 and 11. Device 10 is mounted on the left front portion of the front bumper 12 of the school bus 14 having a passenger compartment 16 situated behind the driver's station 18. Device 11 is mounted on the bus frame 19 forwardly of the rear wheels 21. Devices 10 and 11 operate by micro-wave radar using the doppler shift principle to detect the presence of a moving target within the transceiver range. Inasmuch as each of the devices 10 and 11 are identical, only device 10 will be described in detail.

Figure 2:
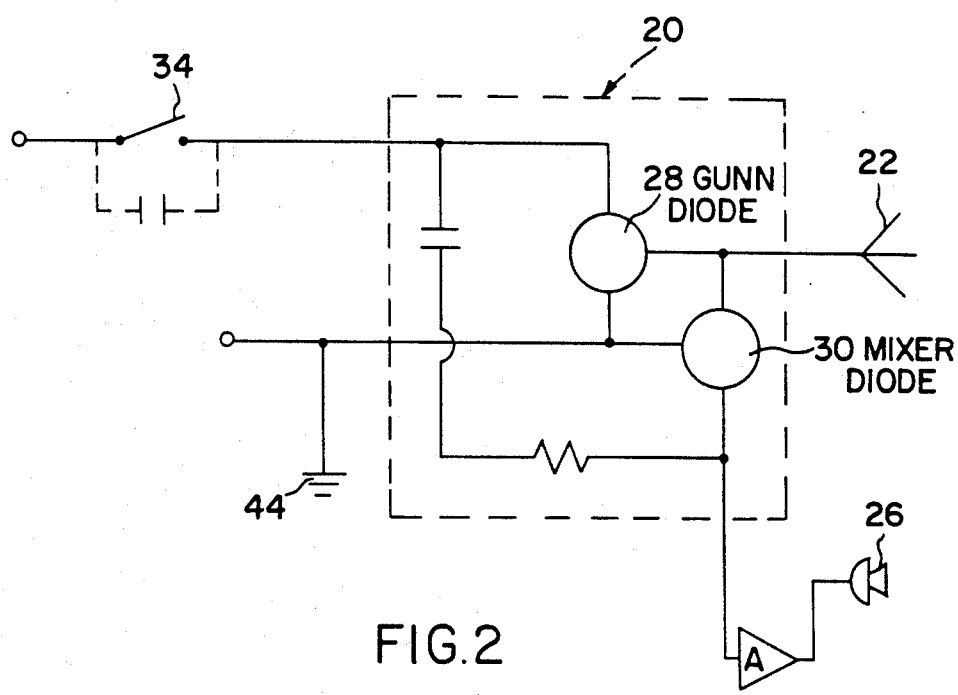
FIG. 2 is an electrical schematic circuit diagram of the driver alerting device.

The operating elements of the device 10 are wholly electronic and are shown in FIG. 2 as including a transceiver 20, an antenna 22, an intermediate frequency amplifier 24 and an audio alarm 26.

The transceiver 20 includes a gunn diode 28 mounted in a wave guide cavity which acts as the transmitter and local oscillator, together with a schottky barrier mixer diode 30 for the receiver. Electromagnetic radiation transmitted from the gunn diode 28 is reflected back at the antenna by any object within the transceiver range. If that object is moving relative to the vehicle, the frequency shift of the wave reflected by the moving object is measured electronically and triggers activation of the alarm 26.

In the preferred embodiment, output frequency of the transceiver 20 is factory preset at 10.525 GIGA HERTZ. Power output is 5 milliwatts minimum. Operating voltage is 8 volts D.C. The resultant doppler frequency obtained is 31.39 HERTZ for each mile per hour of radio velocity. The transceiver is unaffected by the presence of magnetic fields, noise, light and varying weather conditions.

Antenna 22 may be provided as either a high gain antenna or low gain antenna. The high gain antenna is preferred for application with ¼ ton, ½ ton and 1 ton vehicles measuring 80 inches maximum in width. The low gain antenna is preferred on 1 ton and larger vehicles measuring 80 inches and greater in width. The range of the antennas is adjustable and may be user set to accommodate virtually any vehicle. This adjustment is incorporated in the intermediate frequency amplifier 24 and is accessible from the outside of the unit. Antenna 22 is preferably constructed of machined aluminum and is also preferably flange-mounted directly to the transceiver 20, thus eliminating the effects of noise and spurious response. Lines 32 and 33 in FIG. 1 illustrate an example of a typically adjusted wave pattern.

The intermediate frequency amplifier 24 is a solid state, multi-stage operational amplifier designed to amplify and shape the resultant doppler shift signal. The circuitry is card mounted and has built-in range and sensitivity controls. The amplifier is preferably designed to interface with the existing door switch 34

(FIG. 2) in order to activate the circuit only when the door 35 of the school bus has been opened. The circuit is activated when the door is first opened and remains activated while the door remains open and for a predetermined time such as ten seconds after the door has closed. This enables the driver to be warned of any human in the path of the rear wheels until he is well away from his original stationary position.

The audio alarm 26 is mounted interiorly of the passenger compartment 16 so as to be readily audible to the driver of the vehicle. Amplifier 24 drives both the audio alarm 26 and a light emitting diode mounted on the unit. The purpose of the light emitting diode is to aid in the adjustment of the unit in the event that the alarm is not audible to the one adjusting the unit.

Figure 3:
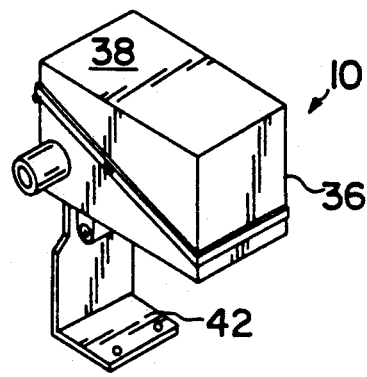
FIG. 3 is a perspective view of one of the safety devices.
Figure 4:
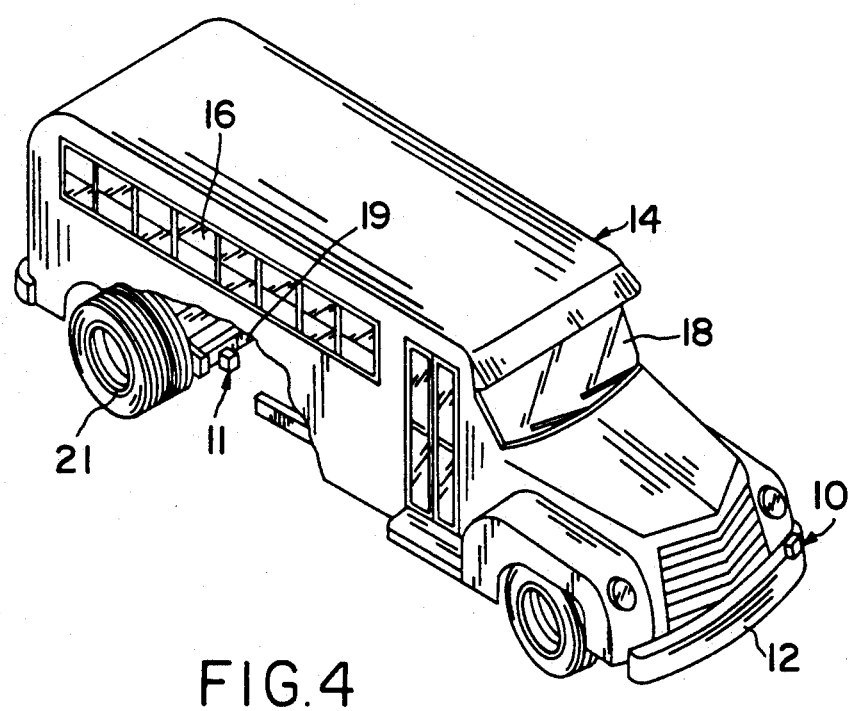
FIG. 4 is a perspective view illustrating the safety devices mounted on the school bus.

The transceiver 20 is shown in FIG. 3 as including a housing 36 which is diagonally sectioned to provide a pivotal top cover 38. The wave output from the transceiver 20 is transmitted outwardly through a rearwardly protruding channel section on the rear wall of housing 36. A mounting flange 42 extends downwardly from the housing for ready attachment to the bus bumper or the bus frame.

The circuitry is card mounted and all components are treated with a conformal coating to prevent the effects of moisture and salt. Electrical hook-up to the bus is achieved via a splash-proof four circuit connector mounted on the side of the unit. One of the four leads is connected to the vehicle ignition switch, one to the switch 34, one to ground 44 and one to alarm 26.

The audio alarm is preferably a solid state piezoelectric alarm capable of developing 80 decibels at 12 volts D.C.

In operation, the transceivers 20 are activated to transmit electromagnetic radiation whenever the door 35 is opened and for a period of approximately ten seconds after the door has been closed. The transceivers emit signals across the forward end of the school bus and beneath the school bus to warn the driver of any humans or objects located in those danger zones. Reflected signals from any object within the transceiver range are picked up by antenna 22 and supplied to the mixer diode 30 where the frequency shift is measured electronically. Amplifier 24 is designed to amplify and shape the resultant doppler shift signal and to activate the alarm 26. Note that when the vehicle is driving forwardly, both stationary and moving objects within the range of the transceivers will be detected since there will be relative movement between the transceiver and these objects. Even when the school bus is stationary, a moving object, such as a child, will be detected by the transceiver and result in activation of the alarm. A stationary object will not be detected when the vehicle is stationary since there is no relative movement to cause a doppler shift signal to be generated. Thus the alarm will stop once the moving object leaves the transceiver range. Likewise, when the buzzer is activated by a stationary object, it will stop once the vehicle is stopped.

Thus there has been shown and described a driver alerting device for a school bus which accomplishes at least all of the stated objectives.

I claim:

1. A driver alerting device for a school bus, said school bus including forward and rearward ends, a pair of front wheels, at least a pair of rear wheels, a passenger door at a side of the school bus adjacent the forward end, and means for opening and closing said passenger door, said driver alerting device comprising: a first transceiver which produces a wave output, comprising a microwave radar device using the Doppler shift principle to detect the presence of an object which is moving relative to said first transceiver and within the range of said first transceiver; means for supporting said first transceiver at the forward end of the bus on a side of the bus opposite to the passenger door side for directing the wave output thereof across the area directly in front of the bus, said transceiver range extending for a distance substantially equal to a width of the bus; means for supplying to said first transceiver return wave signals from any target within the range of said first transceiver; a remote audible alarm positioned within the passenger compartment of the bus; a second transceiver which produces a wave output, comprising a microwave radar device using the Doppler shift principle to detect the presence of an object which is moving relative to said second transceiver and within the range of said second transceiver; means for supporting said second transceiver beneath said bus closely adjacent and between said rear wheels for directing the wave output thereof beneath the bus forwardly of the rear wheels and to the side thereof in an area beneath and adjacent said passenger door, said transceiver range spanning less than a full width of said school bus and extending to a forward edge of said passenger door; means for supplying to said second transceiver return wave signals from a target within the range of said second transceiver; and means for electrically connecting said remoter audible alarm to said first and second transceivers for activation of said alarm in response to detection by either or both of said transceivers of return wave signals from any target within the range of either or both of said transceivers, the transceivers, in operation, being substantially unaffected by varying weather conditions.

2. The device of claim 1 wherein means is provided for electrically connecting said transceivers to the means for opening and closing said door for activation of said transceivers in response to activation of said means for opening and closing said door.

3. The device of claim 1 wherein said first transceiver is positioned at the left front of the bus.

* * * * *